United States Patent [19]

Sweeney

[11] Patent Number: 4,596,648

[45] Date of Patent: Jun. 24, 1986

[54] CONTINUOUS ELECTROLYTIC GAS GENERATOR

[76] Inventor: Charles T. Sweeney, 8711 Burnet Rd., Suite 64, Austin, Tex. 78758

[21] Appl. No.: 634,370

[22] Filed: Jul. 25, 1984

[51] Int. Cl.⁴ .................. C25B 15/08; C25B 9/00; C25B 11/00; C25B 13/00

[52] U.S. Cl. .................. 204/237; 204/256; 204/258; 204/260; 204/286; 204/282

[58] Field of Search .............. 204/237, 256, 266, 260, 204/268, 286

[56] References Cited

U.S. PATENT DOCUMENTS

| | | | |
|---|---|---|---|
| 4,334,968 | 6/1982 | Sweeney | 204/256 X |
| 4,472,256 | 9/1984 | Hilbig | 204/266 |
| 4,484,991 | 11/1984 | Angelo et al. | 204/266 X |
| 4,504,366 | 3/1985 | Jarrett et al. | 204/286 X |

Primary Examiner—Donald R. Valentine
Attorney, Agent, or Firm—Neal J. Mosely

[57] ABSTRACT

A continuous electrolytic generator is disclosed having two sealed compartments, separated by a cation exchange membrane, having a cathode in one compartment, and an anode in the other. A bipolar electrode is positioned in the anode compartment between the cation exchange membrane and the anode. The bipolar electrode may be supported on the dividing wall spaced from the ion-exchange membrane. The bipolar membrane may also be supported on the anode on insulators in spaced relation thereto. The generator has exterior reservoirs for continuously circulating solutions to and from the anode and cathode compartments. A third reservoir receives make-up water and salt and is connected to supply brine to the exterior anode reservoir. The cell produces a mixture of oxidant gases containing chlorine, chlorine dioxide, oxygen, hydrogen peroxide, and possibly ozone, from the anode compartment which is connected to a gas collection and utilization system, e.g., a venturi in a flowing water line. The system includes a pressure switch, responsive to vacuum in the venturi, operable to energize the pumps circulating solutions from the exterior reservoirs only when water is flowing.

23 Claims, 10 Drawing Figures

CONTINUOUS ELECTROLYTIC GAS GENERATOR

BACKGROUND OF THE INVENTION

1. Field of the Invention

This invention relates to new and useful improvements in electrolytic generators and to methods of generating mixtures of oxidizing gases, including oxygen, hydrogen peroxide, ozone, chlorine and chlorine dioxide wherein the generator may be continuously replenished with water and salt during use.

2. Brief Description of the Prior Art

The use of chlorine for disinfecting bodies of water, such as swimming pools, baths, reservoirs, sewage, etc. is well known. In the past, chlorine has usually been supplied by direct application of chlorine gas from tanks containing the gas under pressure. There have also been a number of attempts to provide chlorine gas on a more limited scale by continuous electrolytic generating equipment.

The use of chlorine dioxide in disinfecting bodies of water and in bleaching chemical pulp is well known. Chlorine dioxide is a dangerous and explosive gas and is usually produced as an aqueous solution at the point of usage by chemical decomposition of chlorite salts. The production of chlorine dioxide electrochemically from chlorides is unknown in the literature.

Lindstaedt U.S. Pat. No. 2,887,444 discloses a system in which a body of water, such as, a swimming pool, is provided with a low concentration of dissolved common salt and a stream of water is removed from the main body and electrolyzed to produce chlorine and the chlorine and water stream returned to the main body of water.

Murray U.S. Pat. No. 3,223,242 discloses another type of electrolytic cell for generating chlorine for introduction into a stream of water removed from and introduced back into a swimming pool or other body of water.

Richards U.S. Pat. No. 3,282,823 discloses an electrolytic cell for production of chlorine positioned inline for introducing chlorine into a stream of water removed from and reintroduced into a swimming pool.

Other chlorinating systems using electrolytic cells for production of chlorine for chlorinating bodies of water are shown in Murray U.S. Pat. No. 2,361,663, Oldershaw U.S. Pat. No. 3,351,542, Colvin U.S. Pat. No. 3,378,479, Kirkham U.S. Pat. No. 3,669,857, and Yates U.S. Pat. No. 4,097,356. These electrolytic cells are disclosed in a variety of configurations and most of the cells utilize ion-permeable membranes separating the anode and cathode-containing compartments.

Ion-permeable membrane technology used in electrolytic cells is well developed. Ion-permeable membranes used in electrolytic cells have ranged from asbestos diaphragms to carboxylate resin polymers to perfluorosulfonic acid polymer membranes. The perfluorosulfonic acid membranes were developed by Dupont for use in electrolytic cells. Anion exchange membranes, of polymers having anion functionality, are made by Ionics Inc. of Watertown, Mass.

Dotson U.S. Pat. No. 3,793,163 discloses the use of Dupont perfluorosulfonic acid membranes in electrolytic cells and makes reference to U.S. Pat. Nos. 2,636,851; 3,017,338; 3,560,568; 3,496,077; 2,967,807; 3,282,875 and British Pat. No. 1,184,321 as disclosing such membranes and various uses thereof.

Walmsley U.S. Pat. No. 3,909,378 discloses another type of fluorinated ion exchange polymer used in membranes for electrolytic cells for electrolysis of salt solutions.

Further discussion of membrane technology used in electrolytic cells may be found in Butler U.S. Pat. No. 3,017,338, Danna U.S. Pat. No. 3,775,272, Kircher U.S. Pat. No. 3,960,697, Carlin U.S. Pat. No. 4,010,085 and Westerlund U.S. Pat. No. 4,069,128.

Discussion of perfluorosulfonic acid membranes is also discussed in the technical literature, e.g., Dupont Magazine, May–June 1973, pages 22–25 and a paper entitled "Perfluorinated Ion Exchange Membrane" by Grot, Munn and Walmsley, presented to the 141st National Meeting of the Electro-Chemical Society, Houston, Tex., May 7-11, 1972.

The structure of electrodes used in electrolytic cells is set forth in most of the patents listed above. Additionally, the following U.S. Patents disclose particular configurations of anodes or cathodes used in electrolytic cells.

Giacopelli U.S. Pat. No. 3,375,184 discloses an electrolytic cell with controllable multiple electrodes which are flat plates of wedge-shaped configuration.

Ettel U.S. Pat. No. 3,821,097 discloses the use of flat plates in electroplating cells.

Lohrberg U.S. Pat. No. 3,951,767 discloses the use of flat plate electrolytic anodes having grooves along the bottoms thereof for conducting gas bubbles generated in the electrolytic process.

Andreoli U.S. Pat. No. 565,953 discloses electroplating apparatus having a plurality of metal screens which are not connected in the electric circuit and function to plate out the metal being separated by the electrolysis.

In "The $ClO_2$ content of chlorine obtained by electrolysis of NaCl", Electrochemical Technology 5, 56–58 (1967) Western and Hoogland report that $ClO_2$ is not produced in the electrolysis of NaCl in the absence of chlorates.

Sweeney U.S. Pat. No. 4,256,552 discloses an electrolytic generator for production of chlorine, for chlorination of swimming pools, water systems, etc., in which a bipolar electrode is positioned in the anode compartment between the anode and the cation-exchange membrane in the wall separating the compartments.

Sweeney U.S. Pat. No. 4,334,968 discloses improvements on the cell or generator of patent U.S. Pat. No. 4,256,552 and discloses the production of chlorine dioxide in the cell.

Sweeney U.S. Pat. No. 4,248,681 discloses a method of producing chlorine/chlorine dioxide mixtures in the cells of U.S. Pat. Nos. 4,256,552 and 4,334,968 and gives some optimum operating conditions.

Sweeney U.S. Pat. No. 4,308,117 discloses a cell having three compartments, with the anode and cathode in the outer compartments and the bipolar electrode in the central compartment. A cation-exchange membrane is positioned in the wall between the central compartment and the cathode compartment, while an anion-exchange membrane in positioned in the wall between the central compartment and the anode compartment.

Sweeney U.S. Pat. No. 4,324,635 discloses a cell having an anode compartment, a cathode compartment, and a separating wall with a cathode-exchange membrane therein. The cell includes a pump circulating some of the cathode compartment solution to the anode compartment for pH control.

In subsequent studies, it has been found that cells of the type shown in U.S. Pat. Nos. 4,256,552, 4,334,968 and 4,248,681 can be operated with very low salt concentrations and, under such conditions, produce oxidizing gases containing very small amounts of chlorine or chlorine compounds. It has also been found that some means is needed to replenish the water and salt in the cell without having to shut the system down. This invention is directed to the solution of that problem.

SUMMARY OF THE INVENTION

One of the objects of this invention is to provide a new and improved system of treatment and method of treatment of bodies of water, such as, swimming pools, baths, reservoirs, sewage, etc., and bleaching of chemical pulp, etc., utilizing an electrolytic cell and associated apparatus of novel construction.

Another object of this invention is to provide a new and improved electrolytic cell for production of oxidant gas mixtures, of chlorine and chlorine dioxide, oxygen species, such as oxygen, ozone, and hydrogen peroxide, etc., for treatment of bodies of water and bleaching.

Another object of this invention is to provide a new and improved electrolytic cell for production of oxidant gas mixtures, of chlorine and chlorine dioxide, oxygen species, such as oxygen, ozone, and hydrogen peroxide, etc., which can be operated continuously without need for shutdown to replenish water and salt required for its operation.

Another object of this invention is to provide a new and improved electrolytic cell having an arrangement comprising an anode, a cathode and at least one bipolar electrode, external reservoirs for receiving and recirculating anode and cathode compartment solutions, and a reservoir for receiving sale and make-up water for supplying brine to the external anode compartment reservoir.

Still another object of this invention is to provide a new and improved electrolytic cell having an arrangement comprising an anode, a cathode and at least one bipolar electrode supported on and in spaced relation to a dividing wall having a cation-exchange membrane supported therein.

Still another object of this invention is to provide a new and improved electrolytic cell having an arrangement comprising an anode, a cathode and at least one bipolar electrode supported on said anode on electric insulators in spaced relation thereto and positioned between said anode and a dividing wall having a cation-exchange membrane therein.

Other objects of this invention will become apparent from time to time throughout the specification and the claims as hereinafter related.

The foregoing objects are achieved by a continuous electrolytic generator having two sealed compartments, separated by a cation exchange membrane, having a cathode in one compartment, and an anode in the other. A bipolar electrode is positioned in the anode compartment between the cation exchange membrane and the anode. The bipolar electrode may be supported on the dividing wall spaced from the ion-exchange membrane. The bipolar membrane may also be supported on the anode on insulators in spaced relation thereto. The generator has exterior reservoirs for continuously circulating solutions to and from the anode and cathode compartments. A third reservoir receives make-up water and salt and is connected to supply brine to the exterior anode reservoir. The cell produces a mixture of oxidant gases containing chlorine, chlorine dioxide, oxygen, hydrogen peroxide, and possibly ozone, from the anode compartment which is connected to a gas collection and utilization system, e.g., a venturi in a flowing water line. The system includes a pressure switch, responsive to vacuum in the venturi, operable to energize the pumps circulating solutions from the exterior reservoirs only when water is flowing.

DESCRIPTION OF THE PREFERRED EMBODIMENTS

Figure 1:
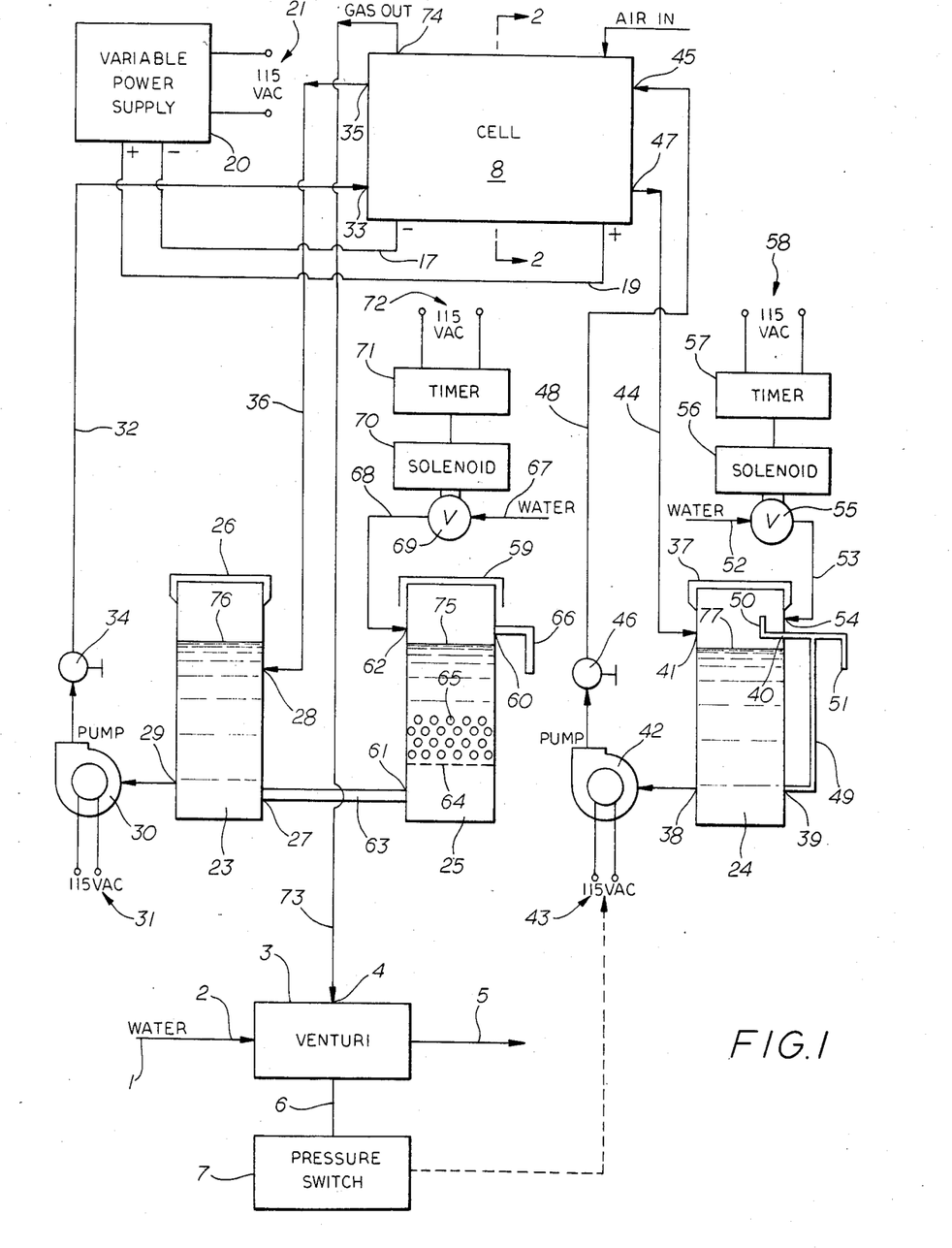
FIG. 1 is a schematic view of a continuous flowing electrolytic cell illustrating a preferred embodiment of this invention.

Referring to FIG. 1, there is shown a system for treatment of a body of water, such as a swimming pool, bath, reservoir, body of sewage, etc. A body of flowing water from a source indicated as 1 flows through a conduit 2 having a venturi 3 positioned therein. Venturi 3 provides a vacuum for drawing an oxidizing gas into the stream of water as indicated at 4 through line 73 leading from outlet 74 on cell 8. Water flowing from the venturi 3 through line 5 contains the oxidizing gases dissolved or dispersed therein. Venturi 3 is also connected by line 6 to pressure switch 7 which controls pumps which circulate solutions to the electrolytic cell 8 which is part of the system to be described below. The contacts of switch 7 are normally open and are closed by application of vacuum resulting from the flow of water through venturi 3.

Figures 2, 3:
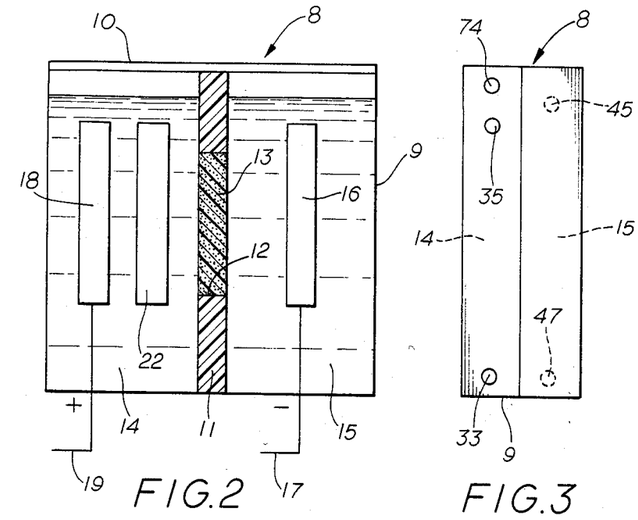
FIG. 2 is a sectional view taken on the line 2—2 of FIG. 1.
FIG. 3 is a view in left elevation of the cell shown in FIG. 1.
Figure 4:
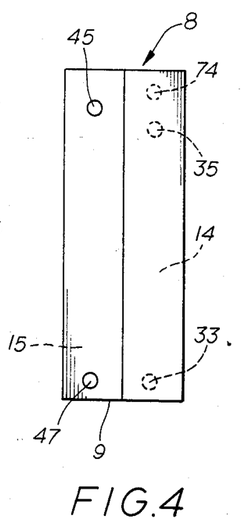
FIG. 4 is a view in right elevation of the cell shown in FIG. 1.

The electrolytic generator or cell 8, shown schematically in FIG. 1, is preferably as shown in FIGS. 2–4, although other embodiments of the cell, as in FIGS. 3–10 can be used. The preferred embodiment of the cell 8, as shown in FIGS. 2–4, produces a mixture of oxidizing gases including oxygen (and possibly ozone), hydrogen peroxide, chlorine dioxide, and chlorine, but the chlorine-containing species are present in only minute amounts when the cell is run at very low salt concentrations.

In FIGS. 2–4, electrolytic generator 8 consists of a hollow container 9 having a removable cover 10 sealed in place. Hollow container 9 is divided by a vertically extending wall 11 which has a window opening 12 in which there is positioned ion-permeable membrane 13 which conducts cations, e.g. Na+, preferably of the type conventionally used in electrolytic cells provided with membrane separation of the anode and the cathode compartments. The preferred membranes are fluorinated polymers, e.g. perflurosulfonic acid polymers, such as NAFION, manufactured by duPont.

Wall member 11 including membrane 13 divides the interior of container 9 into an anode compartment 14 and a cathode compartment 15. A cathode 16 is positioned in cathode compartment 15 and connected by electric lead 17 to a point external to container 9. An anode 18 is positioned in anode compartment 14 and is connected by electric lead 19 to a point external to container 9. The apparatus is provided with a variable power supply 20, such as a transformer powered by 115 volt power source 21 and providing a 12 volt D.C. output connected to electric leads 17 and 19.

An electrically neutral (bipolar) electrode 22 is positioned in anode compartment 14 in a direct line between anode 18 and cathode 16 and adjacent to cation-permeable membrane 13. Electrode 20 is electrically neutral (bipolar) in the sense that it is not connected to the electric circuit energizing the anode 18 and cathode 16 to effect electrolytic decomposition of a salt solution. The cathode 16 is preferably a flat plate of steel, titanium, or other suitable electrode material. The anode 18 and bipolar electrodes may be of metal plates, e.g. steel, titanium, or other suitable electrode material, or may be of carbon plates, if desired.

In FIG. 1, the cell 8 is provided with external reservoirs which permit a continuous flowing operation. Reservoirs 23, 24, and 25 are provided. Reservoir 23 is connected to the anode compartment 14. Reservoir 24 is connected to cathode compartment 15. Reservoir 25 is a storage reservoir for providing make-up water and salt to the system by supplying brine to the anolyte reservoir 23.

Reservoir 23 is preferably a cylindrical vessel with a tightly enclosed top 26, side inlets 27 and 28, and side outlet 29. Pump 30 is operated by 115 VAC power as indicated at 31 and is connected on one side to outlet 29 and on the other side to conduit 32 leading to inlet 33 at the bottom of electrolytic cell 8. A shut-off valve 34 is provided in conduit 32 for manually shutting off that line.

At the top of cell 8, there is an outlet opening 35 which is connected to conduit 36 extending back to the upper inlet opening 28 on anolyte reservoir 23. Pump 30 is operable to circulate anolyte solution between anode compartment 14 and reservoir 23.

Reservoir 24 is preferably a cylindrical vessel with a tightly enclosed top 37, side outlets 38, 39 and 40, and side inlet 41. Pump 42 is operated by 115 VAC power as indicated at 43 and is connected on one side to outlet 38 and on the other side to conduit 44 leading to inlet 45 at the top of cathode chamber 15 of electrolytic cell 8. A shut-off valve 46 is provided in conduit 44 for manually shutting off that line.

At the bottom of cathode chamber 15 of cell 8, there is an outlet opening 47 which is connected to conduit 48 extending back to the inlet opening 41 on catholyte reservoir 24. Outlets 39 and 40 are connected by overflow conduits 49 and 50 leading to overflow line or drain 51. Pump 42 is operable to circulate catholyte solution between cathode compartment 15 and reservoir 24. The cell 8 is located at a higher elevation than the reservoirs 23, 24, and 25, and when the pump 42 is deenergized, the catholyte solution can drain by gravity from compartment 15 into reservoir 24.

Make-up water from a source indicated as 52 is supplied through conduit or line 53 to inlet opening 54 near the top of reservoir 24. Line 53 is controlled by valve 55 which is operated by solenoid 56, controlled by timer 57 operated by 115 VAC power source 58. Timer 57 is operable periodically to cause solenoid 56 to open valve 55 to supply a selected amount of make-up water to reservoir 24.

Reservoir 25 is preferably a cylindrical vessel with a removably enclosed top 37, side outlets 60 and 61, and top side inlet 62. Conduit 63 connects the outlet 61 of reservoir 24 to inlet 27 of reservoir 23. A screen 64 extends across the bottom portion of reservoir 25 to support large granules or pellets of salt 65 which are added through removable top or cover 59. Outlet 60 is connected to overflow line 66.

Make-up water from a source indicated as 67 is supplied through conduit or line 68 to inlet opening 62 near the top of reservoir 25. Line 68 is controlled by valve 69 which is operated by solenoid 70, controlled by timer 71 operated by 115 VAC power source 72. Timer 71 is operable periodically to cause solenoid 70 to open valve 69 to supply a selected amount of make-up water to reservoir 25.

OPERATION

The electrolytic generator or cell described above has been tested and found to be a substantial improvement over more conventional electrolytic gas generators. This generator or cell is an improvement over this inventor's prior patents in that the system consisting of the cell and associated reservoirs and pumps, etc., is operable under continuous flowing conditions. The system can be replenished with water and salt from time to time, or continuously, as needed, without need for shut down. Furthermore, the system operates essentially on demand and shuts down automatically when the flowing water is shut off which is being treated by the oxidizing gaseous effluent from the cell.

In the electrolytic generator system shown, reservoir 25 is charged with a quantity of rock salt or salt pellets 65 on supporting screen 64 and filled with water to a selected level as indicated at 75. This solution passes through line 63 to reservoir 23 to fill to a level 76 which is the same as level 75 in reservoir 25. The levels in these reservoirs will thus rise and fall together. Reservoir 24 is filled with water to a selected level 77. Tap water can be used, although the system may start up better if a small amount of caustic (NaOH) is added.

Pump 30 is energized to pump the solution from reservoir 23 to fill anode compartment 14 to the level of outlet 35 where it flows by gravity back to reservoir 23. Pump 42 is energized only if water is flowing through the venturi 3 to create a vacuum to close pressure switch 7. When pump 42 is operating, solution is pumped from reservoir 24 to the top inlet 45 to cathode compartment 15 where it flows through bottom outlet and line 48 back to the top inlet 41 of reservoir 24. If pump 30 is not operating, the anode compartment 14 remains full. Pump 42, however, must be kept operating to keep the cathode compartment 15 full. If pump 42 stops, compartment 15 will drain by gravity back to reservoir 24 an stop further operation of the cell.

When the anode compartment 14 and cathode compartment 15 are both filled to a level above the top of the various electrodes, i.e. anode, cathode, and bipolar electrode, there is left a small but sufficient space at the top for the collection of gases. Common table salt (NaCl) is added to the water in reservoir 25 which ultimately fills the anode compartment 14. In carrying out this process, any soluble chloride salt may be used, e.g. NaCl, KCl, LiCl, RbCl, CsCl, NH$_4$Cl, MgCl$_2$, CaCl$_2$, etc., although for economic reasons sodium chloride is preferred. The ion-permeable membrane 13 in the cell was Dupont NAFION. Neutral (bipolar) electrode 22 is placed approximately one inch from the membrane 13, although other spacings have been used successfully. 12 volt D.C. were applied and monitored by a D.C. ammeter in the circuit.

The system was then in operation. The equipment has been operated at current flows in the range from 5 to 25 amp. Hydrogen is produced from the cathode 16 and sodium hydroxide (NaOH) forms in the cathode compartment 15. The cathode solution is continuously recirculated to reservoir 24 as long as water is flowing in lines 2 and 5 and pressure switch 7 keeps pump 42 energized.

There was an immediate and rapid production of gas in the anode compartment 14 from the anode 18 and bipolar electrode 22. The gas tends to be primarily chlorine and chlorine dioxide, with smaller amounts of other oxidants, such as oxygen, ozone, and hydrogen peroxide, when the salt concentration is high. When the salt concentration is allowed to drop to very low levels, the cell continues to operate and produced as much oxidant gases as when the salt concentration is higher. Under these conditions, however, the chlorine containing species, i.e. chlorine and chlorine dioxide, are present in very low proportions and the other oxidants predominate. In general, the operation of this cell produces substantially the same oxidant gases as the cells of the inventor's prior patents.

The main difference is that the system can be operated continuously, and salt and water can be added without having to shut down the equipment. This system has been operated for several weeks without shut down while the inventor's older systems have required shut down at much shorter intervals, e.g. daily, whenever it has been necessary to add salt and/or water to the cell. Finally, the system is essentially fail safe, since the stopping of water flow through the venturi 3 will cause switch 7 to open and deenergize pump 42 causing the cathode compartment 15 to empty and stop operation of the cell.

ANOTHER EMBODIMENT

Figure 5:
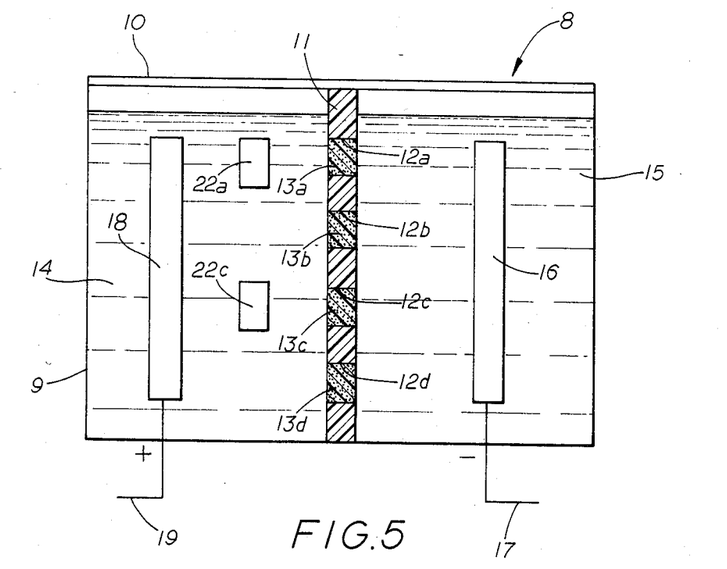
FIG. 5 is a plan view of an alternate embodiment of the cell shown in FIG. 1.

In FIG. 5, there is shown another embodiment of the cell 8 used in this system or in the apparatus or system of the inventor's prior patents. In this embodiment, cell 8 comprises container 9 having cover 10 and divider wall 11 as in the previously described embodiment. Likewise, this embodiment has the same anode 18 and cathode 16 as previously described. Divider wall 11, however, has a plurality of openings 12a, 12b, 12c, and 12d, closed by cation-exchange membranes 13a, 13b, 13c, and 13d, respectively. The cell has two separate bipolar electrodes 22a and 22c aligned with membranes 13a and 13c, respectively. In this embodiment, membranes 13b and 13d do not have bipolar electrodes positioned between them and the anode 18.

In operation, the embodiment of FIG. 5 functions the same as the previously described embodiment except that there is an increased production of chlorine in relation to the other oxidants. This embodiment is therefore to be used where a high yield of chlorine is needed in relation to the other oxidants, viz., chlorine dioxide, oxygen, ozone, and hydrogen peroxide.

VARIATIONS IN BI-POLAR ELECTRODE INSTALLATION

Figure 6:
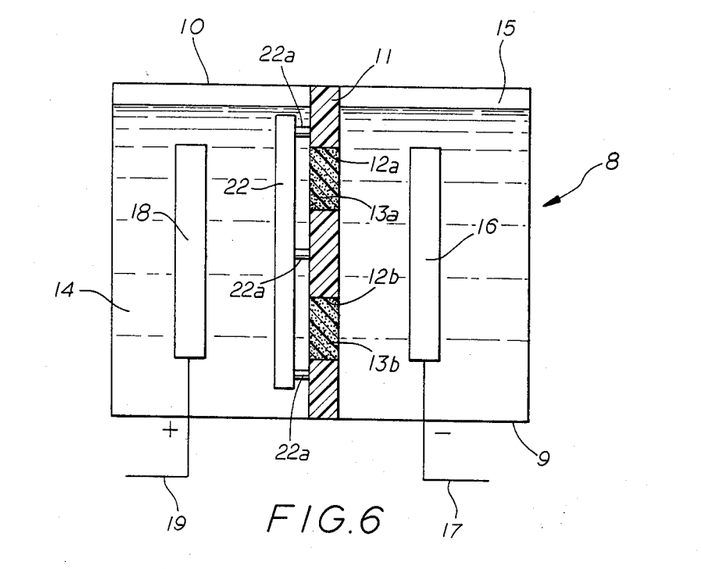
FIG. 6 is a plan view of an alternate embodiment for supporting the bipolar electrodes in the cell shown in FIG. 1.

In FIG. 6, there is shown a variation on the design and mounting of the bipolar electrodes in the cell 8 used in this system or in the apparatus or system of the inventor's prior patents. In this embodiment, cell 8 comprises container 9 having cover 10 and divider wall 11 as in the previously described embodiment. Likewise, this embodiment has the same anode 18 and cathode 16 as previously described. Divider wall 11, however, has a plurality of openings 12a and 12b, closed by cation-exchange membranes 13a and 13b, respectively. The cell has one or more bipolar electrodes 22 aligned with membranes 13a and 13b and supported on supporting studs 22a on wall 11. In this embodiment, the bipolar electrodes are supported between the membranes 13a and 13b and the anode 18 and allow for free circulation of anolyte around them.

Figure 7:
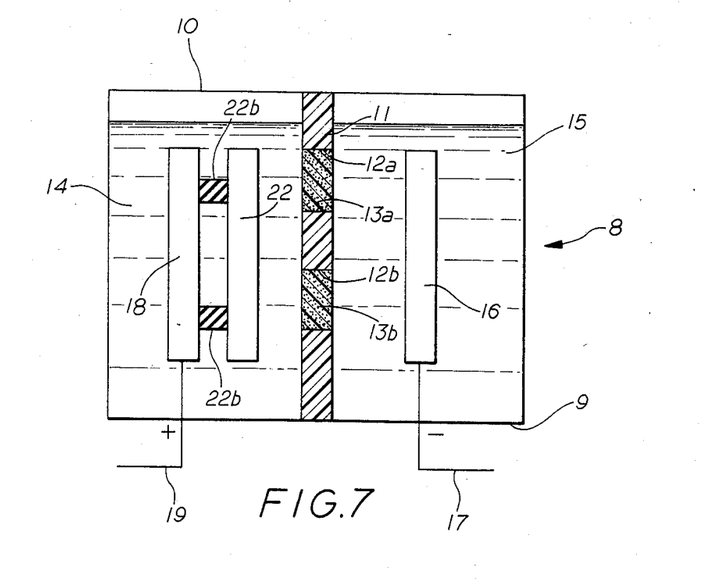
FIG. 7 is a plan view of a further embodiment for supporting the bipolar electrodes in the cell shown in FIG. 1.

In FIG. 7, there is shown a further variation on the design and mounting of the bipolar electrodes in the cell 8 used in this system or in the apparatus or system of the inventor's prior patents. In this embodiment, cell 8 comprises container 9 having cover 10 and divider wall 11 as in the previously described embodiment. Likewise, this embodiment has the same anode 18 and cathode 16 as previously described. Divider wall 11, however, has a plurality of openings 12a and 12b, closed by cation-exchange membranes 13a and 13b, respectively. The cell has one or more bipolar electrodes 22 aligned with membranes 13a and 13b and supported on insulated studs 22b on anode 18. In this embodiment, the bipolar electrodes are supported between the membranes 13a and 13b and the anode 18 and allow for free circulation of anolyte around them. The use of insulated studs 22b maintains the bipolar nature of the electrodes 22 even though supported on the anode 18.

Figure 8:
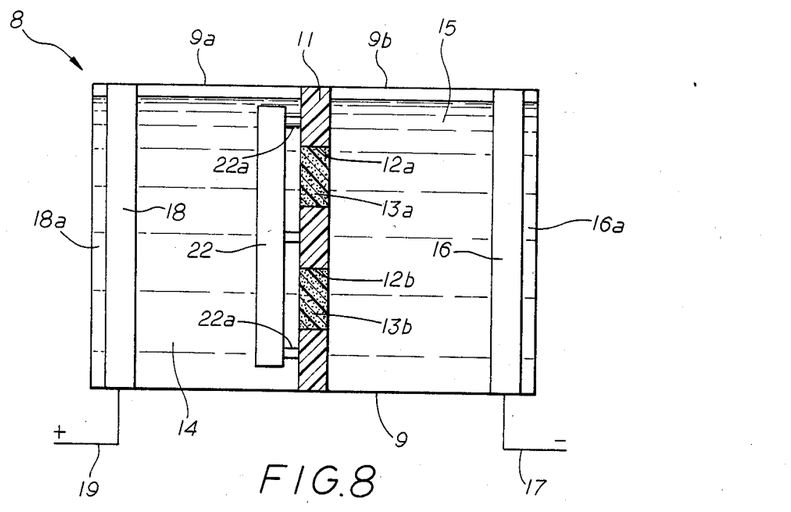
FIG. 8 is a plan view of a modification of the embodiment shown in FIG. 6.

In FIG. 8, there is shown a variation on the design and mounting of the bipolar electrodes in the cell shown in FIG. 6. In this embodiment, cell 8 comprises container 9 formed in two sections 9a and 9b sealed together at divider wall 11. In this embodiment, container sections 9a and 9b are open at both ends and have the outer open ends closed and sealed by anode 18 and cathode 16, respectively, held in place and sealed by end walls 18a and 16a. Divider wall 11 has a plurality of openings 12a and 12b, closed by cation-exchange membranes 13a and 13b, respectively. The cell has one or more bipolar electrodes 22 aligned with membranes 13a and 13b and supported on supporting studs 22a on wall 11. In this embodiment, the bipolar electrodes are supported between the membranes 13a and 13b and the anode 18 and allow for free circulation of anolyte around them. The anode 18 and cathode 16, however, are exposed on only one side to the electrolyte.

OPERATION OF ALTERNATE EMBODIMENTS

In operation, the embodiments of FIGS. 6, 7, and 8 function the same as the previously described embodiment with no change in the composition of the oxidant gases produced. This embodiment therefore represents an improvement in design which contributes to cost improvement without reduction in efficiency of the cell.

CYLINDRICAL CELL DESIGN

Figure 9:
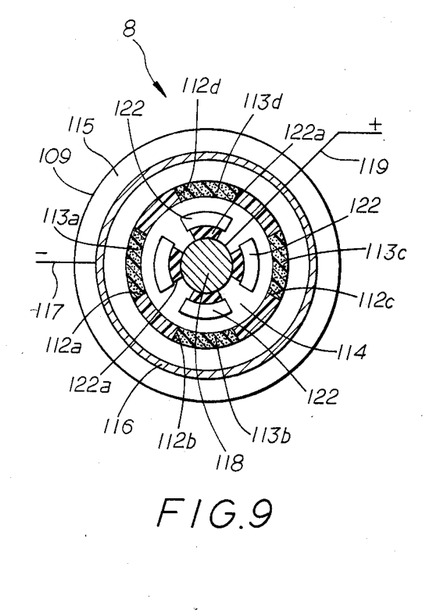
FIG. 9 is a cross sectional schematic view of a cylindrical cell.
Figure 10:
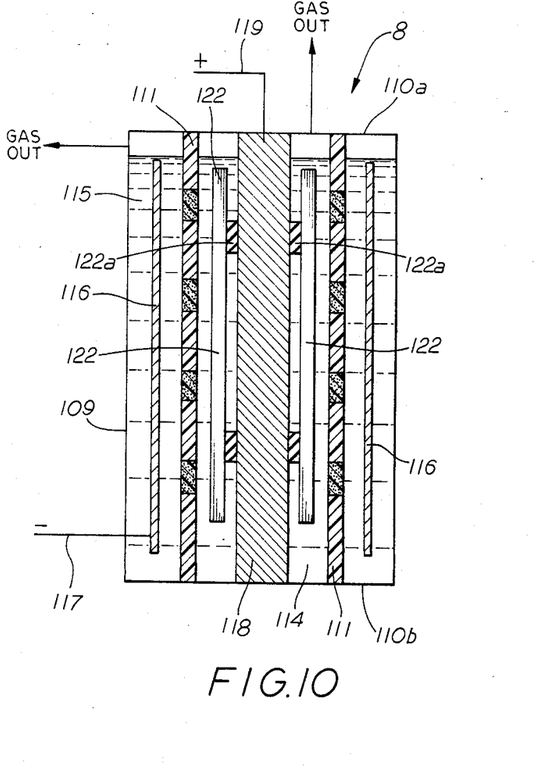
FIG. 10 is a longitudinal sectional schematic view of the embodiment shown in FIG. 9.

FIGS. 9 and 10, there is shown a further variation on the design and mounting of the bipolar electrodes as illustrated in FIG. 7, as applied to a cell of cylindrical construction. In this embodiment, cell 8 comprises cylindrical container 109 having end covers 110a and 110b. Divider wall 111 is cylindrical and sealed to end walls 110a and 110b. In this embodiment, cathode 116 is cylindrical and fits between end walls 110a and 110b in cathode compartment 115 defined by shell 109 and divider wall 111. Divider wall 111 has a plurality of openings 112a, 112b, 112c, and 112d, closed by cation-exchange membranes 113a, 113b, 113c, and 113d, respectively. The anode 118 is rodshaped and is supported in anode chamber 114 inside divider wall 111. The cell has a plurality of bipolar electrodes 122 aligned with membranes 113a–113d and supported on insulated studs 122a on anode 118. In this embodiment, the bipolar electrodes are supported between the membranes 113a–113d and the anode 118 and allow for free circulation of anolyte around them. The use of insulated studs 122a maintains the bipolar nature of the electrodes 122 even though supported on the anode 118.

OPERATION OF CYLINDRICAL CELL

In operation, the embodiment of FIGS. 9 and 10 functions the same as the previously described embodiment with no change in the composition of the oxidant gases produced. This embodiment therefore represents an improvement in design which contributes to cost improvement without reduction in efficiency of the cell. This embodiment is easier to manufacture in some respects and can be connected for continuous circulation of electrolyte through both the anode and cathode compartments.

While this invention has been described fully and completely with emphasis on several preferred embodiments, it should be understood that, within the scope of the appended claims, the invention may be practiced otherwise than as specifically described herein.

I claim:

1. An electrolytic gas generator, adapted to continuous, flowing operation, comprising
   a hollow container having a wall including a permeable cation-exchange membrane, dividing said container into two compartments,
   an anode positioned in one compartment and a cathode positioned in the other compartment,
   a bipolar electrode positioned in said anode compartment aligned between said anode and said membrane and being of a size and shape permitting contact with electrolyte on substantially all sides thereof,
   an outlet from said anode compartment for removal of gas therefrom,
   an outlet from said cathode compartment for removal of gas therefrom,
   first and second remote reservoirs located at a sufficiently lower level than said container that both compartments of said container must be filled against gravity,
   means for circulating electrolyte to and from said anode compartment and said first reservoir,
   means for introduction of salt and of make-up water into said first reservoir,
   means for circulating electrolyte to and from said cathode compartment and said second reservoir,
   means for introduction of make-up water into said second reservoir,
   said circulating means being operable to fill said compartments with sufficient electrolyte to permit electrolysis on energization of said anode and cathode,
   said generator being operable upon filling with electrolyte and energizing to produce a mixture of oxidant gases in said anode compartment and to discharge the same through said anode compartment gas outlet, and
   said lower location of said first and second reservoirs relative to said container causing at least one of said compartments to be drained by gravity flow on inactivation of the means circulating electrolyte thereto.

2. An electrolytic gas generator according to claim 1 in which
   said anode compartment has an opening for admission of air of the opposite side from said gas outlet.

3. An electrolytic gas generator according to claim 1 in which
   said first named and second named circulating means comprise electrically controlled pumps.

4. An electrolytic gas generator according to claim 1 including
   pressure responsive switch means connected to at least one of said pumps and operable to energize the same in response to the flow of water through a line connected to receive oxidizing gas from said anode compartment.

5. An electrolytic gas generator according to claim 4 connected to
   a water line having a venturi connected therein,
   a conduit connecting said venturi to said anode compartment gas outlet, and
   means connecting said venturi to said pressure responsive switch means whereby said switch means is closed in response to water flow.

6. An electrolytic gas generator according to claim 1 in which
   said first reservoir comprises an electrolyte reservoir and a storage reservoir connected together,
   said first circulating means interconnecting said electrolyte reservoir and said anode compartment, and
   said storage reservoir having an opening for introduction of salt and water therein.

7. An electrolytic gas generator according to claim 1 in which
   said first named circulating means includes one conduit extending from said first reservoir to the bottom of said anode compartment and another conduit extending from the top of said anode compartment to said reservoir, and
   said second named circulating means includes one extending from said second reservoir to the top of said cathode compartment and another conduit extending from the bottom of said cathode compartment to said reservoir.

8. An electrolytic gas generator according to claim 1 in which
   said first and second named water introduction means comprise a water source, a control valve, and timing means for operating said control valve to introduce a selected amount of water.

9. An electrolytic gas generator according to claim 1 in which
   said first and second reservoirs are located at a lower level than said container and at least one of said compartments is drained by gravity flow on inactivation of the means circulating electrolyte thereto, and said first named and second named circulating means comprise electrically controlled pumps.

10. An electrolytic gas generator according to claim 1 in which said first and second reservoirs are located at a lower level than said container and at least one of said compartments is drained by gravity flow on inactivation of the means circulating electrolyte thereto, said first named and second named circulating means comprise electrically controlled pumps, and further including pressure responsive switch means connected to at least one of said pumps and operable to energize the same in response to the flow of water through a line connected to receive oxidizing gas from said anode compartment, a water line having a venturi connected therein, a conduit connecting said venturi to said anode compartment gas outlet, and means connecting said venturi to said pressure responsive switch means whereby said switch means is closed in response to water flow.

11. An electrolytic gas generator according to claim 1 in which said first reservoir comprises an electrolyte reservoir and a storage reservoir connected together, said first circulating means interconnecting said electrolyte reservoir and said anode compartment, said storage reservoir having an opening for introduction of salt and water therein, said first named circulating means includes one conduit extending from said first reservoir to the bottom of said anode compartment and another conduit extending from the top of said anode compartment to said reservoir, and said second named circulating means includes one conduit extending from said second reservoir to the top of said cathode compartment and another conduit extending from the bottom of said cathode compartment to said reservoir.

12. An electrolytic gas generator according to claim 1 in which said first reservoir comprises an electrolyte reservoir and a storage reservoir connected together, said first circulating means interconnecting said electrolyte reservoir and said anode compartment, said storage reservoir having an opening for introduction of salt and water therein, said first named circulating means includes one conduit extending from said first reservoir to the bottom of said anode compartment and an electrically controlled pump therein and another conduit extending from the top of said anode compartment to said reservoir, and said second named circulating means includes one conduit extending from said second reservoir to the top of said cathode compartment and an electrically controlled pump therein and another conduit extending from the bottom of said cathode compartment to said reservoir.

13. An electrolytic gas generator according to claim 1 in which said first reservoir comprises an electrolyte reservoir and a storage reservoir connected together, said first circulating means interconnecting said electrolyte reservoir and said anode compartment, said storage reservoir having an opening for introduction of salt and water therein, said first named circulating means includes one conduit extending from said first reservoir to the bottom of said anode compartment and an electrically controlled pump therein and another conduit extending from the top of said anode compartment to said reservoir, said second named circulating means includes one conduit extending from said second reservoir to the top of said cathode compartment and an electrically controlled pump therein and another conduit extending from the bottom of said cathode compartment to said reservoir, said first and second reservoirs are located at a lower level than said container and at least one of said compartments is drained by gravity flow on inactivation of the means circulating electrolyte thereto, said first named and second named circulating means comprise electrically controlled pumps, and further including pressure responsive switch means connected to at least one of said pumps and operable to energize the same in response to the flow of water through a line connected to receive oxidizing gas from said anode compartment, a water line having a venturi connected therein, a conduit connecting said venturi to said anode compartment gas outlet, and means connecting said venturi to said pressure responsive switch means whereby said switch means is closed in response to water flow.

14. An electrolytic gas generator according to claim 1 in which said divider wall includes a plurality of openings, each closed by cation-exchange membranes, and a plurality of said bipolar electrodes aligned between said anode and each of said membranes.

15. An electrolytic gas generator according to claim 1 in which said divider wall includes a plurality of openings, each closed by cation-exchange membranes, and a plurality of said bipolar electrodes aligned between said anode and only part of said membranes.

16. An electrolytic gas generator according to claim 1 in which said anode and cathode are secured on the end walls of the anode and cathode compartments respectively, opposite said divider wall.

17. An electrolytic gas generator according to claim 1 in which said bipolar electrode is supported on said divider wall in predetermined spaced relation to said cation-exchange membrane.

18. An electrolytic gas generator according to claim 1 in which said anode and cathode are secured on the end walls of the anode and cathode compartments respectively, opposite said divider wall, and said bipolar electrode is supported on said divider wall in predetermined spaced relation to said cation-exchange membrane.

19. An electrolytic gas generator according to claim 1 in which said bipolar electrode is supported on said anode, positioned between said anode and said membrane, supported on electrical insulating supporting members to maintain the bipolar character thereof.

20. An electrolytic gas generator according to claim 1 in which said container is cylindrical, said divider wall is cylindrical and positioned to divide said container into an outer annular compartment and an inner cylindrical compartment, said divider wall having a plurality of equally spaced openings with cation-exchange membranes therein, said cathode being cylindrical in shape and positioned in said annular compartment equidistant from said divider wall, said anode being rod shaped and positioned centrally of said inner cylindrical compartment, and a plurality of said bipolar electrodes being supported on said anode on electric insulators in spaced relation thereto and aligned with said membranes.

21. An electrolytic gas generator comprising a hollow container having a wall including a permeable cation-exchange membrane, dividing said container into two compartments, an anode positioned in one compartment and a cathode positioned in the other compartment, said anode and cathode being secured on the end walls of the anode and cathode compartments respectively, opposite said divider wall a bipolar electrode positioned in said anode compartment aligned between said anode and said membrane and being of a size and shape permitting contact with electrolyte on substantially all sides thereof, said bipolar electrode being supported on said divider wall in predetermined spaced relation to said cation-exchange membrane an outlet from said anode compartment for removal of gas therefrom, an outlet from said cathode compartment for removal of gas therefrom, said generator being operable upon filling with electrolyte and energizing to produce a mixture of oxidant gases in said anode compartment and to discharge the same through said anode compartment gas outlet.

22. An electrolytic gas generator comprising a hollow cylindrical container having a hollow cylindrical wall positioned to divide said container into an outer annular compartment and an inner cylindrical compartment and having a plurality of equally spaced openings with cation-exchange membranes therein, a cylindrically shaped cathode positioned in said outer annular compartment equidistant from said divider wall, a rod-shaped anode positioned centrally of said inner cylindrical compartment, a plurality of bipolar electrodes supported on said anode on electric insulators in spaced relation thereto and aligned with said membranes, and being of a size and shape permitting contact with electrolyte on substantially all sides thereof, an outlet from said anode compartment for removal of gas therefrom, an outlet from said cathode compartment for removal of gas therefrom, said generator being operable upon filling with electrolyte and energizing to produce a mixture of oxidant gases in said anode compartment and to discharge the same through said anode compartment gas outlet.

23. A composite electrode for use in an electrolytic gas generator requiring a cathode, anode, and a bipolar electrode, comprising an electrode of electrically conductive material having an electric connector for connection to a power source, a bipolar electrode member supported on electric insulators in spaced relation to said first named electrode to maintain complete electric isolation therefrom when said first name electrode is connected in an electric circuit in an electrolytic cell, and said first named electrode is rod shaped and there are a plurality of said bipolar electrodes equally spaced therearound and in spaced relation thereto on electric insulators.

* * * * *